United States Patent [19]

Emrath

[11] Patent Number: 5,312,473
[45] Date of Patent: May 17, 1994

[54] COOLING SYSTEM FOR AT LEAST ONE MOLD OF AN INDIVIDUAL SECTION TYPE MACHINE FOR PRODUCING HOLLOW GLASS ARTICLES

[75] Inventor: Norbert Emrath, Essen, Fed. Rep. of Germany

[73] Assignee: Ruhrglas GmbH, Essen, Fed. Rep. of Germany

[21] Appl. No.: 949,834

[22] PCT Filed: Mar. 21, 1992

[86] PCT No.: PCT/EP92/00626
§ 371 Date: Nov. 6, 1992
§ 102(e) Date: Nov. 6, 1992

[87] PCT Pub. No.: WO92/17411
PCT Pub. Date: Oct. 15, 1992

[30] Foreign Application Priority Data

Mar. 27, 1991 [DE] Fed. Rep. of Germany ....... 4109985

[51] Int. Cl.$^5$ .......................... C03B 9/38; C03B 11/12
[52] U.S. Cl. ........................ 65/267; 65/319; 65/356
[58] Field of Search ................. 65/356, 319, 267, 265, 65/261, 263

[56] References Cited

U.S. PATENT DOCUMENTS

| | | | |
|---|---|---|---|
| 4,579,576 | 4/1986 | Jones | 65/356 |
| 4,701,202 | 10/1987 | Foster | 65/356 |
| 4,701,203 | 10/1987 | Schneider | 65/356 |
| 4,750,929 | 6/1988 | Bolin | 65/356 |
| 4,909,823 | 3/1990 | Bolin | 65/356 |
| 4,973,347 | 11/1990 | Schommartz et al. | 65/356 |

FOREIGN PATENT DOCUMENTS 0293661 12/1988 European Pat. Off. .
2154229 9/1985 United Kingdom .

*Primary Examiner*—W. Gary Jones
*Assistant Examiner*—Steven P. Griffin
*Attorney, Agent, or Firm*—Herbert Dubno

[57] ABSTRACT

A cooling system for at least one mold of a IS type machine for the production of hollow glass articles has a connecting casing connected on the intake side to a cooling air supply pipe and on the outlet side to the axial cooling passages of the mold when the mold is closed and traversed by a vacuum pipe leading outwards from the bottom of the mold. In order to create such a cooling system wherein the conditions at the station enclosure cooling unit have no influence upon the cooling air action in the connecting casing, and thereby on the mold cooling of the IS type machine, the cooling air supply pipe of the connecting casing is connected directly with a cooling supply source of the IS type machine.

3 Claims, 1 Drawing Sheet

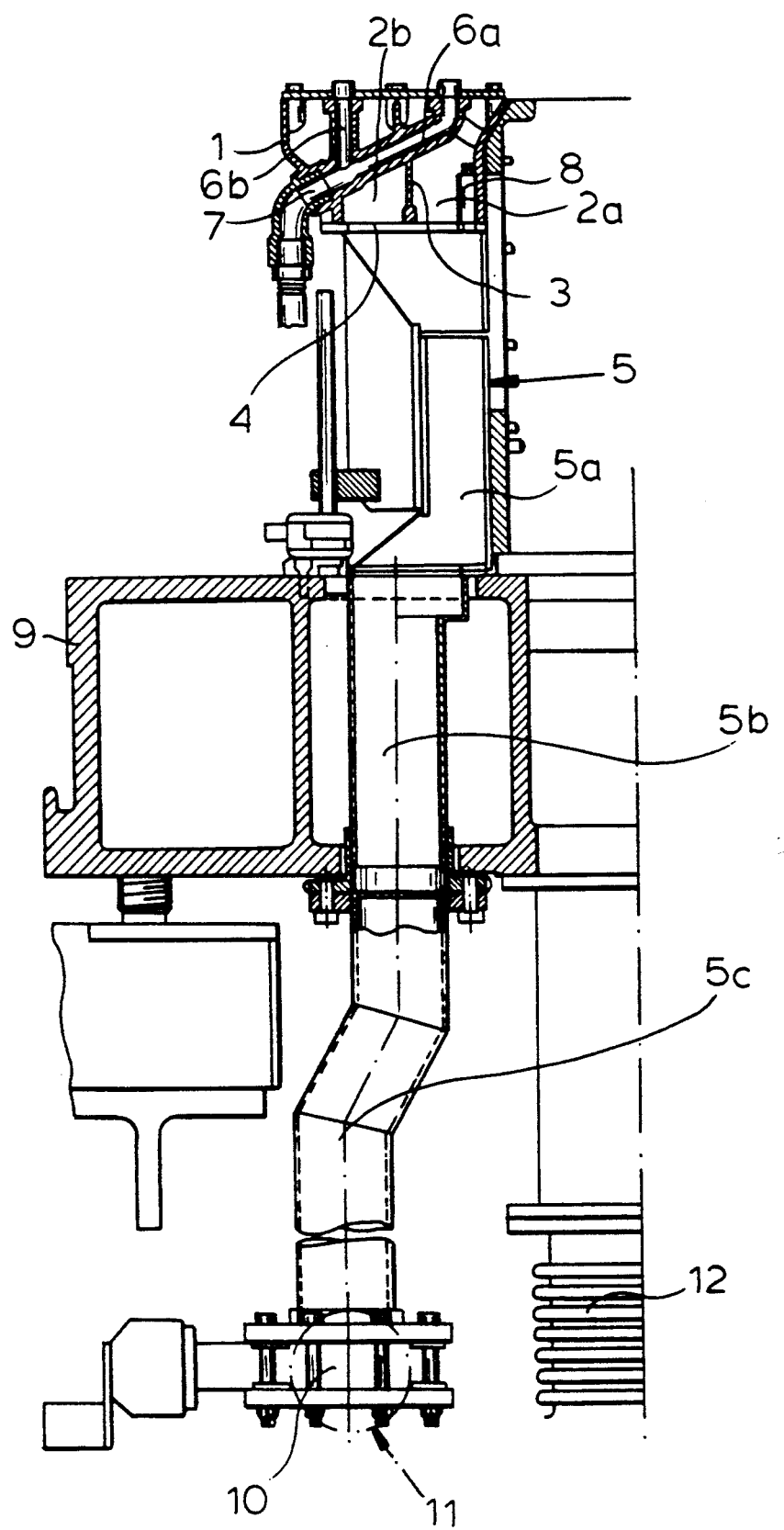

COOLING SYSTEM FOR AT LEAST ONE MOLD OF AN INDIVIDUAL SECTION TYPE MACHINE FOR PRODUCING HOLLOW GLASS ARTICLES

CROSS REFERENCE TO RELATED APPLICATIONS

This application is a national phase of PCT/EP 92/00626 filed 21 Mar. 1992 and based, in turn, upon German national application P 41 09 985.0 filed 27 Mar. 1993 under the international convention.

The invention relates to a cooling system for at least one mold of an IS (individual section) type machine for the production of hollow glass articles having a connecting casing which is connected on the intake side to a supply pipe for cooling air and on the outlet side to the axial cooling air passages of the mold when the mold is closed, and which is traversed by a vacuum pipe leading outwardly from the bottom of the mold.

BACKGROUND OF THE INVENTION

A cooling system of the aforedescribed type is shown in DE 38 37 335 C2. In this known cooling system the connecting casing is subdivided into two cooling chambers, each of which is connected on the intake side, via an inlet passage which can be opened and closed by means of a controlled valve, with a supply pipe for cooling air or a cooling air chamber, this being in turn connected to the station enclosure cooling unit assigned to cover the entire IS or RIS sector. Hereby, the cooling air is guided from the station enclosure cooling unit from the side into the cooling-air supply pipe or chamber arranged underneath the connecting casing.

The cooling air impact on the connecting casing, and implicitly on the molds, is basically determined by the conditions existing at the cooling unit for the station enclosure. Therefore, the cooling of the molds can not always be performed within the optimal range. Furthermore, due to the deflection of the cooling air when it enters the area of the cooling air supply pipe, or the cooling air chamber arranged immediately underneath the connecting casing, considerable turbulence occurs, which makes an even distribution of the available cooling air among the cooling passages of the molds even more difficult.

OBJECT OF THE INVENTION

It is the object of the invention to provide a cooling system for at least one mold of an IS type machine for the production of hollow glass articles, wherein the conditions at the station enclosure cooling unit have no influence on the cooling air action at the connecting casing and thereby on the actual mold cooling of the IS type machine.

SUMMARY OF THE INVENTION

According to the invention, this problem is solved by connecting the cooling air supply pipe of the connecting casing directly to a cooling air supply system of the IS type machine. The area of available cooling air supply pipes in the neighborhood of the connecting casing can be further used by closing the lateral connection of the corresponding area with a sheet metal lid. Due to the direct connection of the connecting casing to the cooling air supply system of the machine via the cooling air supply pipes., the action of the cooling air in the connecting casing is completely independent from the conditions existing at the cooling unit for the station enclosure and is therefore optimally adjustable to the mold cooling. Any timing dependence on the station enclosure cooling unit is eliminated.

When the cooling air supply line runs through the machine bed of the IS type machine and is connected to the cooling air system via a connection piece located approximately underneath the connecting casing, whereby the cooling air supply pipes run approximately in a straight line between the connecting casing and the connection piece, it is possible to almost completely eliminate any turbulence in the cooling supply air line in the neighborhood of the connecting casing; compared to the state of the art, a considerable uniformity of the cooling air action in the cooling passages of the individual molds results.

If in the connection piece a flap valve for the control of the cooling air flow in the cooling air pipes is provided, considerable sealing advantages can be obtained in comparison to other types of valve constructions. These advantages are important, particularly in the sense that otherwise, when the molds are subjected to the action of vacuum, considerable leakage losses can occur.

A further improvement of the sealing characteristics results if the flap valve is supported with double eccentricity.

It is possible to achieve an advantageous distribution of the cooling air entering the connecting casing when in the connecting casing a pre-chamber is provided for each mold.

BRIEF DESCRIPTION OF THE DRAWING

The above and other objects, features, and advantages of the present invention will become more readily apparent from the following description reference being made to the sole figure of the accompanying drawing which is a vertical section through one section of an IS-type machine, parts being shown in elevation.

SPECIFIC DESCRIPTION

A cooling system represented in the drawing serves for feeding cooling air to two molds, not shown in the drawing, of an IS type machine for the production of hollow glass articles.

For this purpose, the cooling system has a connecting casing 1, on the top side of which the molds not shown in the drawing are arranged in the traditional manner. Inside the connecting casing 1, two adjacent pre-chambers 2a, 2b are formed, separated from each other by a dividing wall 3 and each being assigned to one mold. On the intake side, the pre-chambers 2a, 2b are connected via an inlet opening 4 with a cooling air supply line 5, and on the outlet side they are connected with the axial cooling passages provided in the molds when the molds are closed. The pre-chambers 2a, 2b are traversed by vacuum pipes 6a, 6b, which lead outwards from the mold bottoms, not shown in the drawing. In the shown embodiment, the two vacuum pipes 6a, 6b join to form a common pipe segment 7, which outside the connecting casing 1 is connected to a vacuum source controllable in the usual manner.

The connecting casing 1 is fastened by screw bolts 8 or the like to other components of the IS type machine.

When clogging occurs in the channels of the vacuum pipes 6a, 6b, by releasing the screw bolts 8 the connecting casing 1 with the two pre-chambers 2a. 2b can be easily and quickly removed and replaced by a ne connecting casing 1 including new vacuum pipes 6a, 6b, so that the operation of the station can be resumed in a short time. For this purpose the common pipe segment 7 of the vacuum pipes 6a, 6b traverses a wall the pre-chamber 2b of the connecting casing 1.

Underneath the intake opening 4 which connects the connecting casing 1, and the pre-chambers 2a, 2b formed therein with the cooling air supply pipe 5, the latter runs in a first segment 5a vertically downwards from the connecting casing 1 to the machine bed 9 of the IS, type machine, and in a second segment 5b vertically downwards through the machine bed 9 of the IS, type machine in a third segment 5c vertically downwards from the machine bed 9 to a connection piece 10, by means of which the third segment 5c of the cooling air supply pipe 5 is directly connected to the cooling air supply source of the IS, type machine. The connection piece 10 is arranged approximately underneath the connecting casing 1 in vertical direction.

As indicated in the drawing by the dash-dot circle, inside the connection piece 10 a double-eccentrically supported flap valve 11 is arranged, by means of which it is possible to control the supply of cooling air coming from the cooling air supply source of the IS, type machine to the cooling air supply pipe 5 leading to the connecting casing 1.

The connection of the connecting casing 1 to the cooling air supply source of the machine takes place directly through the cooling air supply pipe 5 and the connection piece 10, whereby the cooling air supplied for the connecting casing 1 is not directed via a station enclosure cooling unit 12 of the IS type machine.

I claim:

1. An individual-section type machine for producing hollow glass articles, comprising:
    means forming a machine bed;
    a connecting casing spaced above said bed and open at an upper side to communicate with at least one mold for producing a hollow glass article, to admit cooling air to said mold;
    a vacuum pipe running through said casing and communicating at an upper end with said mold;
    a substantially vertical pipe segment extending through said machine bed directly below said casing and communicating therewith;
    a cooling air supply below said bed; and
    means extending downwardly from said substantially vertical pipe segment for directly connecting said supply to said segment.

2. The individual-section type machine defined in claim 1 wherein said means extending downwardly from said substantially vertical pipe segment includes a further substantially vertical pipe segment provided at a lower end with a connection piece communicating with said cooling air supply, said connection piece being provided with a flap valve for controlling cooling air supply flow.

3. The individual-section type machine defined in claim 1 wherein in said connecting casing a respective prechamber is formed for each mold mounted on said connecting casing, said prechambers being separated in said connecting casing by a partition traversed by said vacuum pipe.

* * * * *